United States Patent [19]

Hübner

[11] 3,905,605
[45] Sept. 16, 1975

[54] FACE SEAL
[75] Inventor: Werner Hübner, Beindersheim, Germany
[73] Assignee: Sulzer-Ksb Kernkraftwerkspumpen GmbH, Frankenthal, Germany
[22] Filed: June 1, 1973
[21] Appl. No.: 366,026

[30] Foreign Application Priority Data
June 9, 1972 Germany............................ 2228081

[52] U.S. Cl. ........................ 277/22; 277/74; 277/75
[51] Int. Cl.² .......................................... F16J 15/00
[58] Field of Search ............... 277/22, 74, 3, 25, 67, 277/75, 134, 85, 93 R

[56] References Cited
UNITED STATES PATENTS

| | | | |
|---|---|---|---|
| 3,090,654 | 5/1963 | Wald................................. | 277/22 X |
| 3,484,113 | 12/1969 | Moore ................................. | 277/93 |
| 3,572,727 | 3/1971 | Greiner............................. | 277/75 X |
| 3,612,548 | 10/1971 | Tracy................................. | 277/74 |
| 3,675,935 | 7/1972 | Ludwig............................. | 277/25 X |
| 3,759,532 | 9/1973 | Lindeboom....................... | 277/75 X |

FOREIGN PATENTS OR APPLICATIONS

| | | | |
|---|---|---|---|
| 686,710 | 5/1964 | Canada................................ | 277/74 |
| 1,228,751 | 4/1971 | United Kingdom................... | 277/74 |
| 1,241,626 | 11/1959 | France................................. | 277/74 |

Primary Examiner—Richard E. Aegerter
Assistant Examiner—L. Footland
Attorney, Agent, or Firm—Michael S. Striker

[57] ABSTRACT

A face seal between a rotary shaft and a stationary housing has an axially annular primary sealing device which is mounted in the housing and surrounds the shaft with at least some clearance, and an annular secondary sealing device which rotates with the shaft and has an end face in sealing engagement with a complementary end face of the primary sealing device to thereby prevent uncontrolled escape of a fluid from a pressure chamber in the housing. One of the sealing devices is formed with a system of channels allowing the fluid to flow from the pressure chamber into a compartment which is remote from the pressure chamber so that the changes of fluid temperature in the pressure chamber cannot cause non-uniform expansion or contraction of the one sealing device which would reduce the area of contact between the end faces to thereby adversely influence the sealing action. The compartment can be provided between the periphery of the shaft and the internal surface of the secondary sealing device or adjacent to one axial end of the primary sealing device. At least one of the sealing devices may be assembled of a ring-shaped carrier and a ring-shaped sealing element which is provided with the respective end face; the channels can be machined into or otherwise formed in the ring-shaped element and/or in the carrier.

12 Claims, 3 Drawing Figures

FACE SEAL

BACKGROUND OF THE INVENTION

The present invention relates to seals in general, and more particularly to improvements in devices which prevent leakage of a gaseous or liquid medium along rotating bodies, for example, along shafts which rotate in stationary housings. Still more particularly, the invention relates to improvements in face seals wherein a primary sealing device normally engages a secondary sealing device to prevent uncontrolled leakage of fluid from a chamber wherein the fluid is maintained at a relatively high pressure to a space wherein the pressure is lower.

A typical face seal comprises a primary sealing ring which is axially movably mounted in a stationary housing and bears against a secondary sealing ring which rotates with a shaft. A drawback of such seals is that the rings are subjected to excessive wear in the event of changes in temperature of the pressurized fluid. For example, if the primary sealing ring and/or its carrier is partially surrounded by a pressurized fluid whose temperature varies, the length of the fluid-contacted portion of the primary sealing ring and/or carrier therefor increases in response to increasing fluid temperature with the result that the area of contact between the primary and secondary sealing rings decreases. In other words, the width of the gap between the adjacent sealing surfaces of the two rings decreases in a direction from the lower-pressure side toward the higher-pressure side. This results in a very pronounced wear upon the contacting portions of the sealing surfaces. When the temperature of the pressurized fluid decreases, the adjacent portion of the primary sealing ring and/or its carrier contracts axially so that the width of the gap changes again but in the opposite direction. If the temperature of the pressurized fluid changes gradually, the time interval which is required for heating or cooling of the entire primary sealing ring and/or its carrier to the changed temperature of the fluid suffices to cause a pronounced wear on portions of the sealing surfaces with the result that the effectiveness of the seal decreases and the fluid is likely to leak from the high-pressure chamber to the low-pressure area.

If the changes in temperature of the pressurized fluid are substantial, the sealing rings and/or the carriers therefor are likely to develop cracks which render the seal useless and might necessitate a lengthy interruption in the operation of a pump or the like in order to replace the defective seal with a fresh seal. Furthermore, the wear upon the sealing rings is quite pronounced even if the temperature of the pressurized fluid varies within a rather narrow range because the changes in axial length of one or both rings and/or their carriers suffice to bring about unequal wear on the sealing surfaces. For example, if the rise in temperature of pressurized fluid above a normal temperature is followed by a drop in temperature below the normal temperature, the wear upon the sealing surfaces travels from the higher-pressure end of the sealing gap toward the lower-pressure end so that the sealing action is unsatisfactory not only at normal temperature but also when the temperature of the pressurized fluid rises above or drops below the normal temperature.

The situation is analogous in radial type seals wherein one of the sealing rings surrounds the other sealing ring. If the temperature at one axial end of one of the sealing rings changes, the wear upon the contacting sealing surfaces becomes localized and the sealing action deteriorates.

The wear upon the sealing devices is quite pronounced if the temperature of confined fluid varies at frequent intervals and within a rather wide range. Therefore, the sealing devices must be inspected and replaced after a relatively short period of use.

SUMMARY OF THE INVENTION

An object of the invention is to provide a face seal which is constructed and assembled in such a way that changes in the temperature of confined fluid cannot or are less likely to adversely affect the sealing action.

Another object of the invention is to provide a face seal wherein the annular sealing device which is contacted by the body of confined fluid is constructed with a view to insure uniform expansion or contraction of all of its portions or parts in response to changes of the temperature of confined fluid.

A further object of the invention is to provide novel and improved primary and secondary sealing devices for use in face seals, particularly in face seals which are used to prevent the escape of a pressurized fluid from a housing surrounding a rotary shaft which extends from the housing.

An additional object of the invention is to provide a face seal which can be installed in existing pumps or analogous apparatus to effectively prevent uncontrolled leakage of a confined liquid or gaseous medium whose temperature varies within a wide range.

A further object of the invention is to provide a face seal wherein the changes in temperature of a confined fluid result in less pronounced wear upon the primary and/or secondary seals than in heretofore known face seals.

An ancillary object of the invention is to provide the sealing element and/or the carrier for the sealing element of a primary or secondary seal with novel and improved means for equalizing its temperature in response to changes in the temperature of confined fluid.

The invention is embodied in a seal, particularly in a face seal, which comprises a rotary member (e.g., the shaft of a pump), a stationary member (e.g., the housing or body of a pump from which the rotary member extends) defining with the rotary member a liquid-containing chamber, a primary annular sealing device provided in the stationary member (this primary annular sealing device may comprise a ring-shaped carrier which is axially movably secured to the stationary member and a ring-shaped sealing element which is secured to and is coaxial with the carrier), and a secondary annular sealing device (including a ring-shaped carrier and/or a ring-shaped sealing element which sealingly engages the sealing element of the primary sealing device) which is provided on the rotary member and cooperates with the primary sealing device to prevent or to reduce the leakage of fluid from the chamber.

In accordance with a feature of the invention, at least one of the sealing devices has a first surface which is in contact with the fluid in the chamber, a second surface located substantially opposite to or being remote from the first surface, and one or more channels extending between the two surfaces to permit the flow of fluid from the chamber into a compartment which the second surface defines with the respective member or with the other sealing device so that the fluid can exchange heat with the one sealing device along both surfaces and the temperature of the one sealing device in the region of the first surface equals or approximates the temperature of the one sealing device in the region of the other surface. This insures a uniform or nearly uniform expansion or contraction of the one sealing device in response to changes of fluid temperature and thereby reduces the likelihood of uncontrolled leakage of fluid from the chamber. Thus, and since the sealing device which is contacted by the fluid undergoes a uniform expansion or contraction, the area of contact between the two ring-shaped sealing elements remains unaffected by changes in the temperature of confined fluid. This not only reduces the likelihood of uncontrolled leakage but also the likelihood of uneven wear upon the sealing elements.

The novel features which are considered as characteristic of the invention are set forth in particular in the appended claims. The improved seal itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
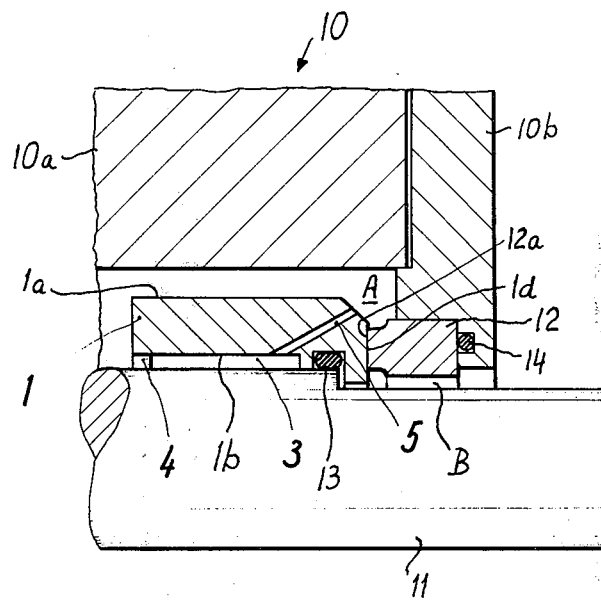
FIG. 1 is a fragmentary axial sectional view of a face seal which embodies one form of the invention and wherein the channels are provided in a one-piece secondary sealing device which rotates with the shaft.

Referring first to FIG. 1, there is shown a face seal which is utilized to prevent the leakage (or to substantially reduce the leakage) of a pressurized hydraulic or pneumatic fluid from a chamber A to a low-pressure area or space B. The chamber A is defined by a stationary member 10 (including portions 10a, 10b) which constitutes the housing of a pump or the like and a rotary member 11 which constitutes a shaft and a portion of which extends from the stationary member.

The annular primary sealing device comprises a ring-shaped sealing element 12 which is secured to the portion 10b of the stationary member 10 and surrounds the periphery of the rotary member 11 with at least some clearance to define therewith a portion of the low-pressure space B. The annular secondary sealing device comprises a relatively long one-piece ring-shaped sealing element 1 which rotates with the member 11 and has a cylindrical external surface 1a in contact with the body of fluid in the chamber A. The sealing element 1 is further provided with an internal cylindrical surface 1b which defines with the periphery of the rotary member 11 an annular compartment 3 into which the fluid can flow by way of one or more inclined channels or bores 5 machined into the sealing element 1 so as to make an acute angle with the axis of the rotary member 11. The surface 1b is further provided with two or more inwardly extending centering and supporting projections or ribs 4 which define with the peripheral surface of the rotary member 11 a number of passages wherein the fluid can flow between the compartment 3 and the chamber A. An O-ring 13 is provided in an internal groove of the sealing element 1 and engages the peripheral surface of the rotary member 11 to prevent the flow of fluid from the compartment 3 into the low-pressure space B.

The sealing element 12 has an end face 12a which engages the adjacent end face 1d of the sealing element 1 to prevent the leakage of fluid from the chamber A into the space B. The inclined channels 5 cause the fluid to flow between the chamber A and the compartment 3 when the rotary member 11 is driven and rotates the sealing element 1 and O-ring 13. It will be noted that the channels 5 are adjacent to the end faces 1d and 12a.

The operation is as follows: The end faces 12a and 1d abut against each other in a plane which is normal to the axis of the rotary member 11 to effectively prevent the flow of fluid from the chamber A into the space B. The portion 10b of the stationary member 10 may be provided with means for biasing the sealing element 12 toward the sealing element 1 to thus compensate for normal wear in the region of the end faces 12a and 1d. For example, the means for biasing the sealing element 12 axially toward the sealing element 1 may comprise an O-ring 14 in the portion 10b and/or a set of helical springs, not shown.

The channels 5 insure that the temperature along the external surface 1a of the sealing element 1 matches or approximates the temperature of the sealing element 1 along the internal surface 1b. Thus, if the temperature of fluid in the chamber A changes, the expansion or contraction of the sealing element 1 in the region of the surface 1a is the same as or substantially identical with the expansion or contraction of the sealing element 1 in the region of the surface 1b. Therefore, the end face 1d remains in a plane which is normal to the axis of the rotary member 11 and is parallel to the plane of the end face 12a. This greatly reduces the likelihood of uneven wear upon the end faces 1d and 12a and thereby reduces the likelihood of greater leakage in response to changes in temperature of the fluid which is confined in the chamber A. In the absence of channels 5 and compartment 3, the axial length of the sealing element 1 would increase along the surface 1a in response to heating of fluid in the chamber A so that the area of contact between the end faces 1d and 12a would decrease, i.e., the end faces 1d, 12a would remain in contact along their outermost portions but would be out of contact in the region which is adjacent to the space B. Analogously, the area of contact between the end faces 1d and 12a would decrease in response to a cooling of fluid in the chamber A because the sealing element 1 would contract mainly along the external surface 1a so that the end faces 1d, 12a would remain in contact in the region of the space B but not in the region of the outer ends of the channels 5. In each case, the wear upon the end faces 1d, 12a would be nonuniform so that the sealing action would remain unsatisfactory even upon completed cooling or heating of the entire sealing element 1 to a uniform temperature because at least one of the end faces 1d, 12a would have a portion making an acute angle with a plane which is normal to the axis of the rotary member 1.

The sealing element 12 is rather short; therefore, eventual differences between the axial lengths of its inner and outer portions do not appreciably influence the sealing action between the end faces 1d, 12a even if the temperature in the chamber A differs substantially from the temperature in the space B.

The channels 5 are preferably equidistant from each other, as considered in the circumferential direction of the rotary member 11.

It has been found that the useful life of the sealing element 1 is much longer than the useful life of a similarly dimensioned sealing element which does not have any means for insuring uniform cooling or heating. Also, the sealing action is much more satisfactory than in conventional face seals.

Figure 2:
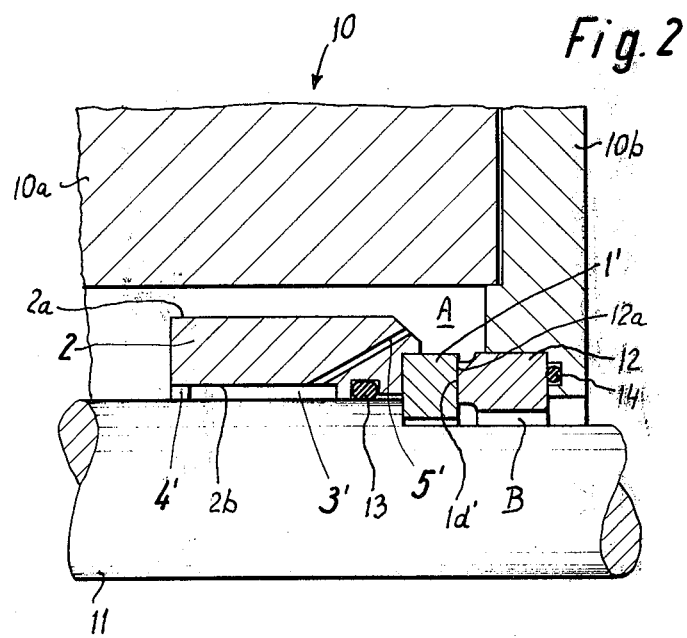
FIG. 2 is a similar fragmentary axial sectional view of a face seal which constitutes a modification of the face seal shown in FIG. 1 and wherein the channels are provided in a carrier for the ring-shaped sealing element of the secondary sealing device.

In the face seal of FIG. 2, the stationary member 10, the annular primary sealing device including the sealing element 12, and the rotary member 11 are identical with the similarly referenced parts shown in FIG. 1. The secondary sealing device comprises a ring-shaped carrier 2 which is similar to the ring-shaped sealing element 1 of FIG. 1 and a ring-shaped sealing element 1' which is supported by and is coaxial with the carrier 2. The cylindrical external and internal surfaces 2a, 2b of the carrier 2 are connected to each other by one or more inclined channels 5' which allow the fluid to flow from the chamber A to a compartment 3' between the peripheral surface of the rotary member 11 and the internal surface 2b. The centering and supporting projections of the carrier 2 are shown at 4', the O-ring at 13, and the means for biasing the sealing element 12 axially at 14. The manner in which the fluid which is caused to circulate between the chamber A and compartment 3' effects a uniform expansion or contraction of the carrier 2 when the temperature in the chamber A changes is the same as described for the sealing element 1 of FIG. 1. The abutting end faces of the sealing elements 12 and 1' are respectively shown at 12a and 1d'.

Figure 3:
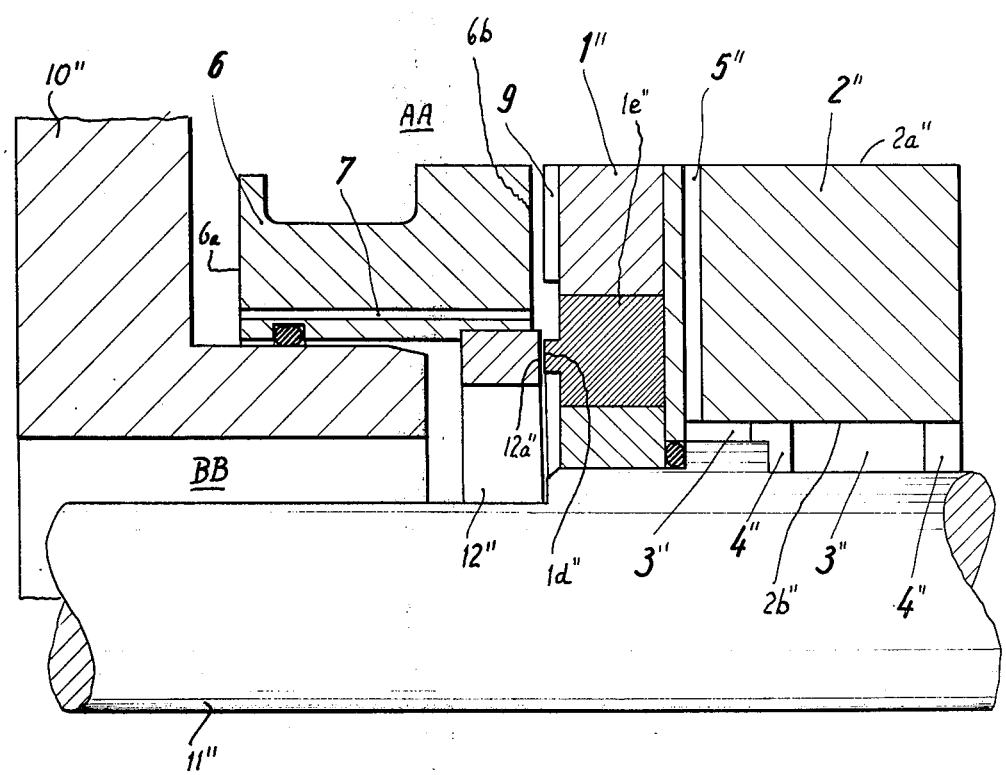
FIG. 3 is a fragmentary axial sectional view of a third face seal wherein additional channels are provided in the ring-shaped carrier of a primary sealing device.

FIG. 3 illustrates a modified face seal which prevents or controls the leakage of a fluid from a chamber AA into a low-pressure space BB. The secondary sealing device which rotates with the rotary member 11" comprises a ring-shaped carrier 2" and a ring-shaped sealing element 1". The latter has a central portion 1e" provided with an end face 1d" which engages the end face 12a" of a ring-shaped sealing element 12" forming part of a primary sealing device which further includes a carrier 6 having a substantial axial length. The carrier 6 is movable axially in a stationary member 10" so that the end face 12a" can bear against the end face 1d".

The carrier 2" is provided with radially extending channels 5" (only one shown) which allow the fluid which is confined in the chamber AA to flow into an annular compartment 3" provided between the periphery of the rotary member 11" and the internal cylindrical surface 2b" of the carrier 2". The external cylindrical surface of the carrier 2" is shown at 2a". The supporting ribs or projections which extend inwardly from the surface 2b" and center the carrier 2" and its sealing element 1" on the rotary member 11" are shown at 4".

In addition to insuring a uniform expansion or contraction of the carrier 2" for the sealing element 1" of the secondary sealing device, the face seal of FIG. 3 is further provided with means for insuring uniform expansion or contraction of the relatively long carrier 6 for the sealing element 12" of the primary sealing device. As shown, the carrier 6 has a first surface 6a at one axial end thereof which is fully contracted by fluid in the chamber AA and a second surface 6b located at the other axial end of the carrier 6 and being closely adjacent to the sealing element 1". The carrier 6 has one or more axially parallel channels or bores 7 which allow the fluid to flow between the surfaces 6a, 6b to thus insure uniform expansion or contraction of the carrier in response to changing temperature of fluid in the chamber AA. The sealing element 1" of the secondary sealing device has one or more radially extending vanes or blades 9 which are adjacent to the surface 6b and constitute a simple impeller for causing the fluid to flow through the channel or channels 7 when the rotary member 11" is driven by a motor or another suitable prime mover and rotates the secondary sealing device 1", 2". The seal which is shown in FIG. 3 comprises means for insuring uniform heating or cooling of both sealing devices. This is desirable when the primary and secondary sealing devices comprise ring-shaped portions of substantial axial length.

It is clear that the seal of FIG. 3 can be modified by providing additional means for insuring uniform expansion or contraction of all portions of the sealing element 1" and/or 12". Such additional means can be provided instead of the corresponding means for the carrier 2" or 6. As a rule, it suffices to insure uniform expansion or contraction of the carrier if the mass (and particularly the axial length) of the carrier greatly exceeds the mass of the corresponding sealing element, or vice versa. Also, and as shown in FIG. 1, it suffices to insure uniform expansion or contraction of the larger of two sealing elements.

The improved sealing devices can be used with advantage in mechanical as well as in hydrostatic or hydrodynamic seals wherein the end faces of the sealing elements define a gap for controlled leakage of the fluid toward the low-pressure space.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a seal, particularly in a face seal, a combination comprising a rotary member; a stationary member defining with said rotary member a chamber for a supply of fluid whose temperature fluctuates at times within a wide range; a primary annular sealing device provided in said stationary member; and a secondary annular sealing device provided on said rotary member and cooperating with said primary sealing device to at least reduce the leakage of fluid from said chamber, one of said sealing devices having a first surface in contact with the fluid in said chamber, a second surface located substantially opposite said first surface and also in contact with the fluid in said chamber, and channel means provided in said one sealing device between said surfaces thereof to permit the fluid to circulate within said chamber and to exchange heat with said one sealing device along said surfaces so that the temperature of said one sealing device in the region of said first surface equals or approximates the temperature of said one sealing device in the region of said second surface irrespective of fluctuations of the temperature of fluid in said chamber, said second surface of said one sealing device defining with the periphery of said rotary member an annular compartment which constitutes a first portion of said chamber, said chamber further having a second portion in communication with said compartment at a plurality of locations including communication by way of said channel means, said one sealing device further having internal centering projections abutting against the periphery of said rotary member.

2. A combination as defined in claim 1, wherein said one sealing device comprises a ring-shaped sealing element secured to the respective member, said surfaces being provided on and said channel means being provided in said sealing element.

3. A combination as defined in claim 1, wherein said first surface is an external surface of said one sealing device and said second surface is an internal surface of said one sealing device, said one sealing device constituting said secondary sealing device.

4. A combination as defined in claim 1, wherein said rotary member is a shaft and said stationary member is a housing for said shaft, said sealing devices having abutting end faces which prevent uncontrolled escape of fluid from said chamber.

5. A combination as defined in claim 1, wherein said one sealing device is said primary sealing device and is movable axially of said rotary member, said one sealing device further comprising an end face in sealing engagement with a complementary end face provided on said secondary sealing device.

6. A combination as defined in claim 1, wherein said sealing devices have abutting end faces adjacent to one axial end of said compartment.

7. In a seal, particularly in a face seal, a combination comprising a rotary member; a stationary member defining with said rotary member a chamber for a supply of fluid whose temperature fluctuates at times within a wide range; a primary annular sealing device provided in said stationary member; and a secondary annular sealing device provided on said rotary member and cooperating with said primary sealing device to at least reduce the leakage of fluid from said chamber, one of said sealing devices having a first surface in contact with the fluid in said chamber, a second surface located substantially opposite said first surface and also in contact with the fluid in said chamber, and channel means provided in said one sealing device between said surfaces thereof to permit the fluid to circulate within said chamber and to exchange heat with said one sealing device along said surfaces so that the temperature of said one sealing device in the region of said first surface equals or approximates the temperature of said one sealing device in the region of said second surface irrespective of fluctuations of the temperature of fluid in said chamber, said one sealing device comprising a carrier secured to the respective member and a ring-shaped sealing element secured to said carrier, said surfaces being provided on and said channel means being provided in said carrier.

8. In a seal, particularly in a face seal, a combination comprising a rotary member; a stationary member defining with said rotary member a chamber for a supply of fluid whose temperature fluctuates at times within a wide range; a primary annular sealing device provided in said stationary member; and a secondary annular sealing device provided on said rotary member and cooperating with said primary sealing device to at least reduce the leakage of fluid from said chamber, one of said sealing devices having a first surface in contact with the fluid in said chamber, a second surface located substantially opposite said first surface and also in contact with the fluid in said chamber, and channel means provided in said one sealing device between said surfaces thereof to permit the fluid to circulate within said chamber and to exchange heat with said one sealing device along said surfaces so that the temperature of said one sealing device in the region of said first surface equals or approximates the temperature of said one sealing device in the region of said second surface irrespective of fluctuations of the temperature of fluid in said chamber, said primary and secondary sealing devices further respectively comprising first and second end faces which contact each other in a plane normal to the axis of said rotary member to thus prevent uncontrolled escape of fluid from said chamber, said surfaces of said one sealing device being located radially inwardly and outwardly of and flanking said end face of said one sealing device.

9. In a seal, particularly in a face seal, a combination comprising a rotary member; a stationary member defining with said rotary member a chamber for a supply of fluid whose temperature fluctuates at times within a wide range; a primary annular sealing device provided in said stationary member; and a secondary annular sealing device provided on said rotary member and cooperating with said primary sealing device to at least reduce the leakage of fluid from said chamber, one of said sealing devices having a first surface in contact with the fluid in said chamber, a second surface located substantially opposite said first surface and also in contact with the fluid in said chamber, and channel means provided in said one sealing device between said surfaces thereof to permit the fluid to circulate within said chamber and to exchange heat with said one sealing device along said surfaces so that the temperature of said one sealing device in the region of said first surface equals or approximates the temperature of said one sealing device in the region of said second surface irrespective of fluctuations of the temperature of fluid in said chamber, said one sealing device comprising a plurality of coaxial ring-shaped portions and said channel means being provided in at least one of said ring-shaped portions.

10. In a seal, particularly in a face seal, a combination comprising a rotary member; a stationary member defining with said rotary member a chamber for a supply of fluid whose temperature fluctuates at times within a wide range; a primary annular sealing device provided in said stationary member; and a secondary annular sealing device provided on said rotary member and cooperating with said primary sealing device to at least reduce the leakage of fluid from said chamber, said primary sealing device being movable axially of said rotary member and having a first surface in contact with the fluid in said chamber, a second surface located substantially opposite said first surface and also in contact with the fluid in said chamber, and channel means provided in said primary sealing device between said surfaces thereof to permit the fluid to circulate within said chamber and to exchange heat with said primary sealing device along said surfaces so that the temperature of said primary sealing device in the region of said first surface equals or approximates the temperature of said primary sealing device in the region of said second surface irrespective of fluctuations of the temperature of fluid in said chamber, said primary sealing device further comprising an end face in sealing engagement with a complementary end face provided on said secondary sealing device said end face of said primary sealing device being adjacent to said second surface thereof and said channel means comprising at least one bore parallel to the axis of said rotary member, said bore being provided in and extending between said surfaces of said primary sealing device.

11. A combination as defined in claim 10, wherein said secondary sealing device comprises impeller means for promoting the flow of fluid in said channel means.

12. A combination as defined in claim 10, wherein said primary sealing device comprises a carrier axially movably mounted in said stationary member and a ring-shaped sealing element engaging said secondary sealing device and secured to said carrier, said surfaces being provided on and said channel means being provided in said carrier.

* * * * *